Figure 1:
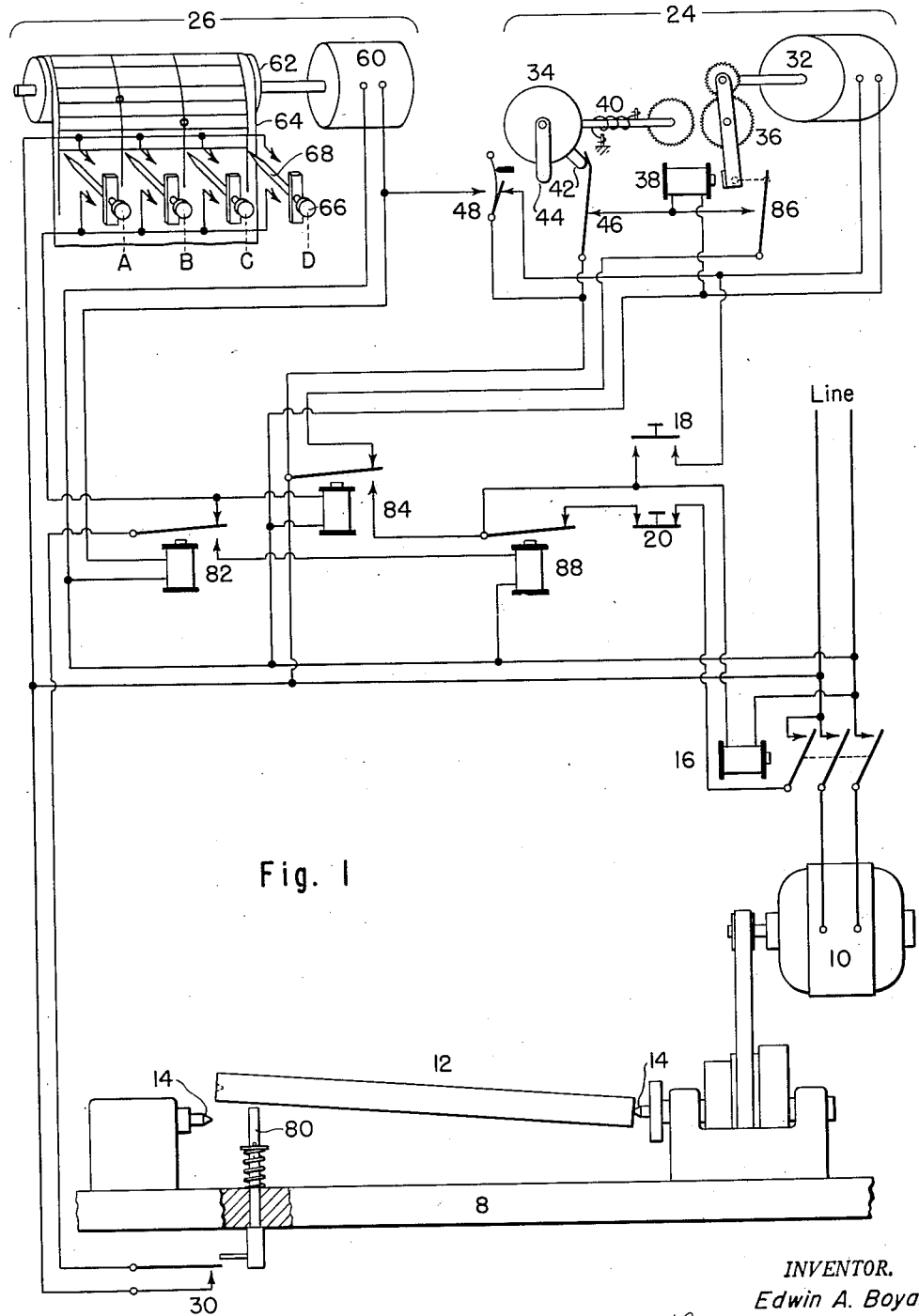

April 1, 1952     E. A. BOYAN     2,591,124
APPARATUS FOR PRODUCTION ANALYSIS
Filed April 11, 1946     3 Sheets-Sheet 1

INVENTOR.
Edwin A. Boyan
BY Jenney & Hildreth
ATTORNEYS

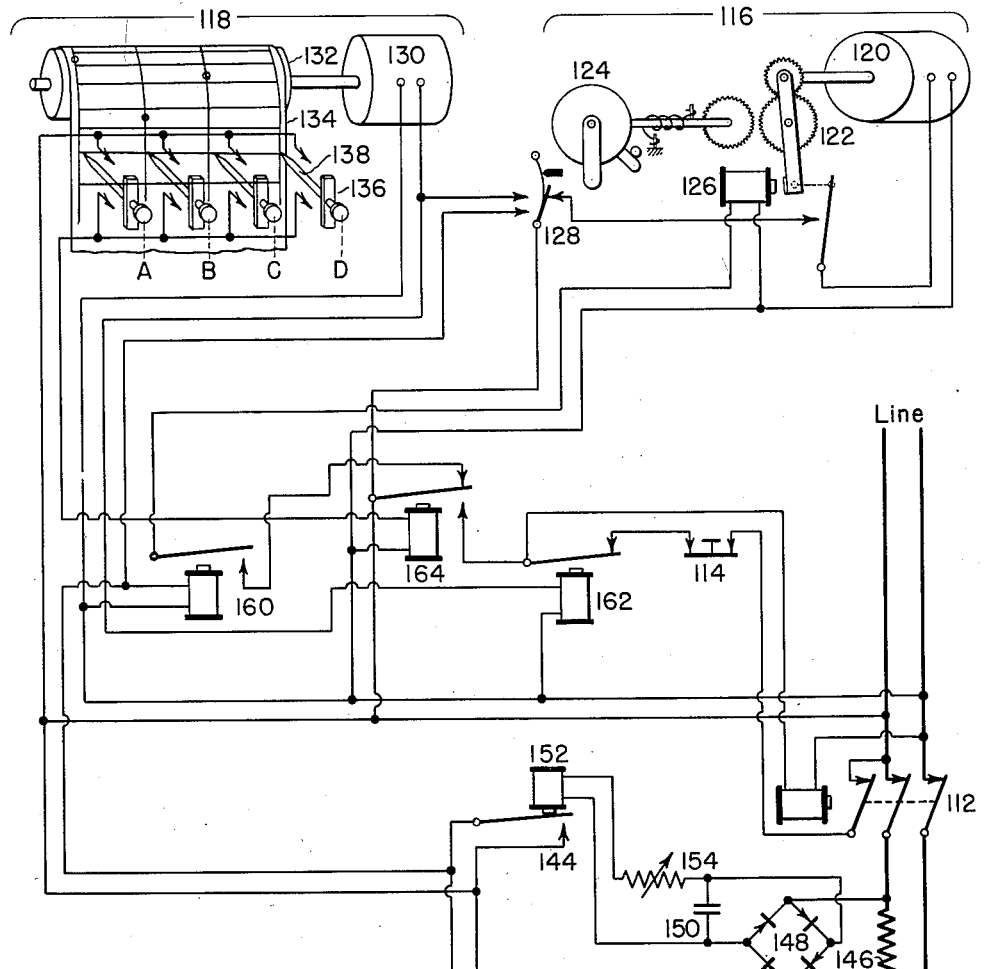
Fig. 2
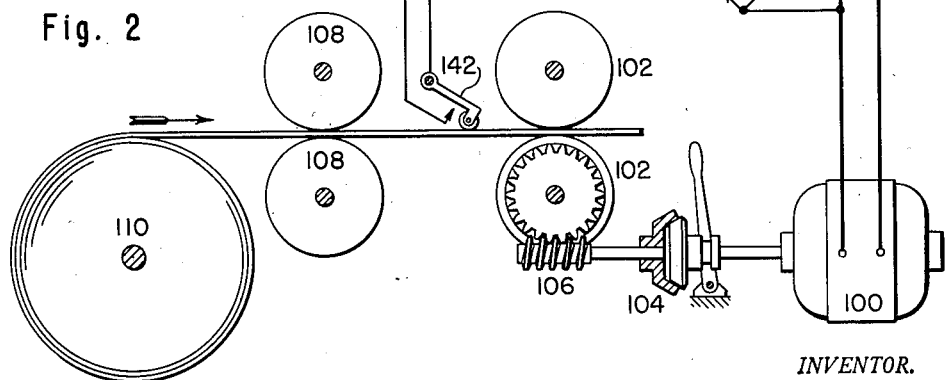

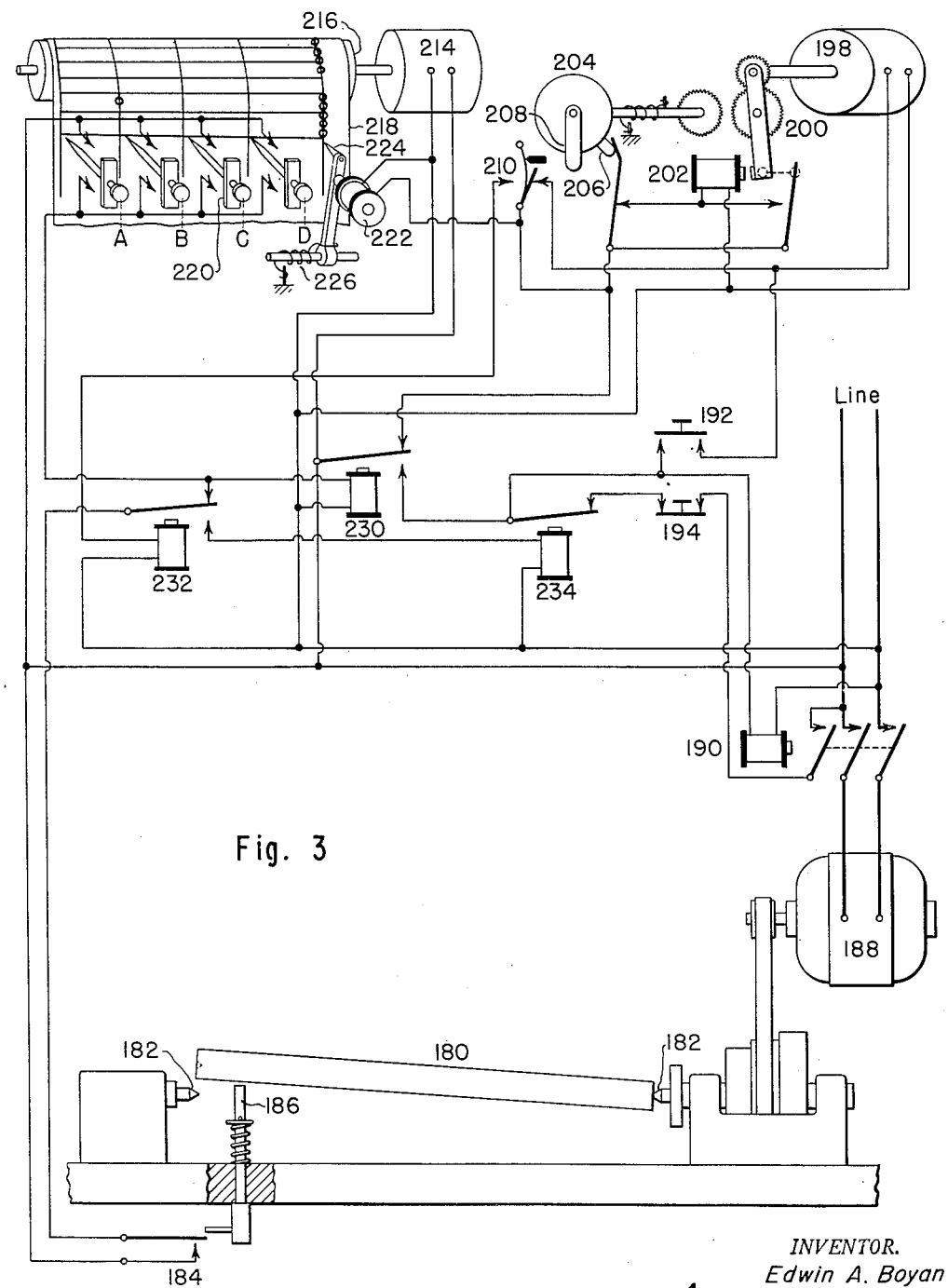

Patented Apr. 1, 1952

2,591,124

UNITED STATES PATENT OFFICE 2,591,124

APPARATUS FOR PRODUCTION ANALYSIS

Edwin A. Boyan, Sharon, Mass.

Application April 11, 1946, Serial No. 661,312

12 Claims. (Cl. 346—25)

The present invention relates to apparatus for production analysis and control, and more particularly to apparatus for recording pertinent data concerning the performance and operation of a machine or process.

For the effective control of productivity and production costs in industrial management, it is necessary to have accurate and comprehensive information as to the various interruptions to or deviations from the normal operating routine of a machine, process, or manually executed procedure. Such deviations or interruptions may then be classified in appropriate categories for study as to their cause and relative importance. Careful analysis frequently permits the elimination of recurring interferences with production, for which the operator of the machine or equipment may in no way be chargeable.

In many instances the deviations from an accepted norm will be in respect to time, manifested as abnormal delays in completing an operation or manipulation. The deviations or departures concerning which data is required may likewise be in terms of quality or size of product or article, as determined by gauging, test, or other inspection technique.

While various means have been proposed by which the requisite data may be obtained, in general it has been necessary to employ skilled observers, or else to make use of elaborate recording and signalling apparatus, in order to tabulate the pertinent data in sufficient detail and with the necessary accuracy.

It is an object of the present invention to provide apparatus of relatively simple construction and arrangement for causing significant data concerning the operation of a machine, process, or manually executed procedure to be recorded in a form suitable for subsequent study, so as to permit comprehensive analysis for effective production and cost control.

More specifically, it is an object of the invention to provide apparatus for production control which may readily be attached to existing machinery or processing equipment or associated with an assembly or test operation or other manually-executed procedure and which will provide, with a minimum of attention on the part of the machine operator, accurate and comprehensive records of the causes and frequency of occurrence of non-compliance with a predetermined norm for said operation or procedure.

According to a feature of the invention, the production analysis apparatus comprises means adapted to be associated with a machine or with devices or equipment for carrying out a process, test, assembly, or the like, which means is arranged automatically to detect non-compliance, on the part of the operator or the equipment, with a predetermined norm for the particular operation. In the event a non-compliance is detected, such as failure to complete an operation within a time interval previously established as adequate under normal conditions, or failure to meet a predetermined standard for quality, size, or other criterion, then the machine, process, or procedure is caused to become temporarily disabled or interrupted so as to prevent a continuation of operation. The apparatus is so arranged that resumption of operation can be effected only by actuating restart means having associated therewith recording mechanism by which the operator is enabled to record the cause for the non-compliance in a form suitable for subsequent analysis. Thus it becomes possible readily to ascertain the nature and relative importance of the interferences or interruptions to normal operation for that particular equipment and operator.

More specifically, in accordance with one embodiment of the invention, means are provided by which any undue interruption in the normal operating time sequence of the machine to which the apparatus is attached, sets in motion elapsed-time recording apparatus, and likewise actuates a disabling circuit to render the machine temporarily inoperative. The effect of this disabling circuit is to require the operator, in order to resume machine operation, to actuate a restart device which includes means for designating on the time-recording medium the reason for the interruption. A single record sheet or tape may thus provide a complete report on the nature and duration of the various interruptions occurring in a given work period.

In the case of a machine performing a repetitive operation, the production analysis apparatus may be arranged to allow a predetermined time for the operation to be carried out in normal fashion, the apparatus recycling automatically upon each repetition of the operation within this predetermined allowed time without setting in motion the idle time recorder. If an abnormal time is required, however, as might be the case in the event of tool breakage, before the machine operation is repeated, then the timing means will automatically record the passage of time in excess of the normal time allowance, and the machine operator will be required to actuate the restart and cause-recording mechanism before normal machine operation can be resumed.

For machines performing a substantially continuous rather than a repetitive operation, the delay-analysis apparatus may be made responsive to such factors as load on the driving motor, or presence of material at some operating point or station, so as to set in motion the elapsed-time recorder a predetermined time after the operation or process becomes interrupted. As in the apparatus for repetitive-type operations, resumption of normal machine operation requires that the operator actuate the restart and cause-recording means in order to provide a permanent record of the duration and reason for the delay for subsequent analysis.

In the drawings illustrating the invention, Fig. 1 is a schematic diagram of delay-analysis apparatus for use in conjunction with machines and devices that perform repetitive operations; Fig. 2 is a schematic diagram of a modified form of delay analysis apparatus adapted for use in conjunction with equipment that normally performs a substantially continuous operation, and Fig. 3 is a schematic diagram of a further modification of the production analysis apparatus resembling in general the embodiment of Fig. 1 for use in conjunction with machines and devices performing repetitive operations, but arranged to provide a complete record of normal machine operation in addition to the record of interruptions and their causes. It will be understood that the embodiments shown in the drawings are merely illustrative, and that numerous modifications are possible in adapting the analysis apparatus to specific equipment, machines, and processes without departing from the invention.

The apparatus of the invention is arranged to permit use in conjunction with a wide variety of machines and equipment, including both power driven and manually operated types. The analysis apparatus is arranged for electrical actuation, but may be readily be attached to equipment other than electrically driven machines and apparatus.

In the embodiment illustrated in Fig. 1, the analysis apparatus is shown connected to a simple machine 8 driven by an electric motor 10. The work, represented at 12, is supported during the operation of the machine on centers 14. The driving motor for the machine is connected to the supply line through the usual solenoid-actuated switch 16 under the control of push button switches 18 and 20. These switches permit the motor to be started and stopped in normal fashion for work changes, so long as each piece of work is turned out within a predetermined time limit for which the analyzer has been set.

The analyzer comprises, as its principal elements, a timer 24 for establishing a normal timing interval within which the operation on one piece of work is normally accomplished, and time recording means 26 for recording the times involved whenever the normal interval expires without finishing the work piece. These components, together with the necessary control switches and relays, may be arranged for simple installation on practically any machine that performs a repetitive operation, since the only electrical connections necessary are conveniently made to the motor switch 16 and to a special "piece switch" 30 mounted on the machine so as to be responsive to the presence of work in the machine or to the existence of a condition, position, or adjustment that is characteristic of operation, as opposed to non-operation, or of an acceptable as distinguished from a non-acceptable condition, as in the case of inspection or quality control.

The timer 24 may be of generally conventional construction, comprising a synchronous driving motor 32 which drives the timing dial 34 through a gear train 36 that is engaged and disengaged by means of a solenoid 38. A spring 40 returns the timer dial to zero wherever the solenoid is deenergized and the gear train disengaged. The timer dial carries fixed and movable arms 42 and 44. The fixed arm serves to close contacts 46 when the dial is at zero. The arm 44 is settable on the timing dial to actuate a switch 48 when the timing dial has rotated through the allotted time interval. The switch 48 is of the single pole, double throw type and is snap acting. Its normal position is as shown in the drawing. When engaged by the arm 44, it is caused to snap from its right hand to its left hand position, returning to the position shown in Fig. 1 as soon as the solenoid 38 is deenergized and the timing dial resets to zero.

The recording means 26 for indicating abnormal time delays and their cause is illustrated in simplified fashion as comprising a synchronous type motor 60 connected to a drum 62 for advancing a paper strip 64. Disposed transversely of the paper is a row of push button switches 66. These push buttons are arranged, when actuated, to close an electrical circuit and at the same time to mark the paper web. In the illustrative embodiment, the switches are provided with pointed members 68 that perforate the paper when the corresponding push button is pressed. The transverse position of a mark or perforation on the web thus reveals the identity of the actuated button, while the position of the marks longitudinally of the web indicates time.

The several restart buttons 66 carry legends or other designation indicative of the various types of delay that the machine operation is apt to encounter. Thus, typical causes might be "broken tool," "lack of material," "wrong dimensions" or the like, the designations being chosen on the basis of a preliminary analysis of the delays and interruptions to which that type of machine is subject. Such legends are typified by the symbols A, B, C, D on the respective buttons, although it will be understood that the appropriate designations may be made in a variety of ways.

The piece switch 30 already referred to is of the momentary-make type, with one-way actuation. A plunger 80 is mounted on the machine so as to be depressed by the work 12 when the latter is placed in position on the machine centers. Actuation of the plunger causes the switch contacts 30 to make momentarily on the down stroke of the plunger and then to reopen. No switch actuation results from the up-stroke of the plunger. The switch thus is actuated once each time a new piece of work is inserted in the machine, so as to provide a momentary closing of the piece switch circuit. The disposition of the switch for direct actuation by the work is merely illustrative, since switching means may be mounted for actuation in many other ways to respond to operative condition of the machine by a momentary closure at the commencement of each operation.

The several components of the analyzer are so arranged that when a new piece of work is inserted in the machine (assuming for the present that the machine has just been started in normal fashion at the beginning of a shift) the actuation of the piece switch starts the timer 24. This is accomplished through a recycling circuit that includes a relay 82, termed a switching relay, and a relay 84 hereinafter called the recycling relay. The operation of the recycling circuit is as follows: With the momentary closing of piece switch 30, the solenoid of relay 84 is briefly energized. This breaks the upper set of relay contacts, thus deenergizing the timer solenoid 38, disengaging the gear train 36, and allowing the timer dial to return to zero under the influence of spring 40.

The actuation of the piece switch also serves to initiate a new timing cycle, since the solenoid 38 is reenergized as soon as the timer dial returns to zero, due to the closing of switch 46 under the action of fixed arm 42 carried by the timer dial. Even though this switch reopens as soon as the dial has progressed but slightly from zero, the timer remains energized through the operation of a holding switch 86 controlled by the timer solenoid 38 and closed whenever the latter is energized.

The piece switch thus serves throughout the normal operation of the machine to recycle the timer at each insertion of a new piece of work in the machine. Provided the machine operation is completed within the allowed time interval as determined by the timer setting, the operation of the machine proceeds in entirely normal fashion, using the start and stop switches 18 and 20 to stop and restart the motor each time the work is changed.

In the event an operation is not completed within the allotted time interval, then a different sequence of events occurs. The time recording means 26 is started, and the piece switch is disconnected from the recycling circuit and connected to a disabling circuit in control of the driving motor 10. This result is brought about through the operation of snap switch 48. When the movable member is thrown to its left hand position by the action of the timer arm 44, the driving motor 60 for the recorder drum is energized and commences to advance the paper web 64. The solenoid of relay 82 is likewise energized. This disconnects the piece switch 30 from the solenoid of relay 84, and connects the former to a relay 88, termed the disabling relay. The contacts of relay 88 are normally closed, and are included in the holding circuit for the main motor switch 16. As a result, when the piece switch is next actuated, the disabling relay 88 is tripped, thus breaking the holding circuit and causing the switch 16 to shut off the motor 10, if the motor has not already been stopped by operation of the stop switch 20.

It is no longer possible, as a result of the operation of the analysis apparatus, to restart the machine driving motor by actuating the switch 18, since the normal starting circuit for the motor has been temporarily disabled. This results from inclusion of the starter switch 18 in series with the right hand contact of the snap switch 48. Because this circuit has been opened by the action of the timer upon reaching the limit of the allotted time, the regular start switch is now unable to energize the solenoid of main switch 16.

To restart the machine from its so-called disabled condition following a delay period, it is necessary to actuate one of the special restart and recording buttons 66 on the timer recorder unit 26. Actuation of any one of these buttons closes a restart circuit to actuate relay 84. Upon opening the upper set of contacts of this relay, the solenoid 38 is deenergized to recycle the timer 24 and likewise stop the recorder motor 60. When the lower contacts of relay 84 close, the solenoid of the main switch 16 is energized to pull in the switch and start the machine motor. The holding contacts of switch 16 are immediately effective to maintain current through the switch solenoid even though relay 84 is deenergized as soon as the actuated restart button is released.

The operator of the machine is instructed, whenever a delay occurs that results in the machine being rendered temporarily inoperative as a result of operation of the disabling circuit of the analyzer, to push the particular restart button that bears the appropriate identification for the cause of the delay or interruption to normal operation. In doing this, the operator causes the portion 68 of the selected button to perforate or mark the paper web. The transverse position of this mark or perforation on the web provides for subsequent identification of the particular button actuated, and hence of the cause for the delay. The longitudinal position of the mark along the web from the previous mark gives the time involved in that delay or interruption, by correlation with the rate of travel of the web when the recorder is in operation. Since the recorder in this embodiment of the invention, runs only during the idle or abnormal time, there is provided a permanent record of all the idle time of the machine, with positive identification of the various causes to permit breakdown and analysis of the relative occurrence and importance of the various types of delays and interruptions that recur in the operation of the particular machine.

For machines where the normal operation is carried out in more or less continuous fashion, with interruptions at irregular intervals to permit replenishing the supply of material, for example, a modification of the analyzer may be employed. A typical analyzer for continuous-type operations is shown in Fig. 2, the showing of the machine on which the analyzer is installed being merely illustrative.

The machine comprises a driving motor 100 which rotates feed rolls 102 through a clutch 104 and gear drive 106. A web of material to be processed is drawn by the feed rolls 102 through rolls 108 from a supply reel 110. The motor is controlled by the usual solenoid-actuated switch 112. A stop switch 114 may be provided for shutting off the motor 100, but the usual start button is omitted, as it is contemplated in the illustrative embodiment that the clutch 104 will be utilized to stop the machine when the web is to be replenished.

The principal components of the analyzer are, as in the first described embodiment, a timer 116 and a recorder unit 118. The timer includes the motor 120, gear train 122, timer dial 124, solenoid 126 and snap switch 128. The snap switch includes an extra contact that is closed when the movable member shifts to its left hand position. The recorder includes a driving motor 130, drum 132, paper strip 134, and a plurality of restart switches 136 having marking members 138. These switches will carry appropriate designations to indicate the various types of interruptions apt to be encountered with that machine or process, the indicia A, B, C and D being merely illustrative.

In this embodiment of the analyzer, the circuits are so arranged that the timer and recorder remain at rest so long as the operation or process continues in normal fashion. To detect interruptions in the normal operating routine, a switch 142 is arranged to be held open so long as the web of material is present between the roll stations. When the web breaks, or the supply becomes exhausted, the switch 142 closes and sets in motion the analysis apparatus.

As an alternative to the web switch 142, or as in the embodiment of Fig. 2, by way of supplement thereto, there may be provided a switch 144 responsive to the load on the driving motor 100, so that when the load on the motor drops below a predetermined minimum, the switch will close to set in motion the analyzer. This load-sensitive switch is actuated by the voltage drop across a resistor 146 in the motor circuit. In the case of alternating current supply, the voltage derived from the potential drop is rectified at 148, filtered by a condenser 150 and supplied to solenoid 152 through an adjustable resistance 154. Thus the switch 144 is held open so long as the potential drop across resistor 146 is above a definite magnitude, representing a predetermined load on the motor 100. It is obvious that other arrangements for detecting an interruption in the normal operation of the machine or process may readily be provided to meet the particular requirements of the equipment with which the analyzer is to operate.

The switch or switches responsive to process interruption serve to control a relay 160. Actuation of relay 160 completes a circuit through the timer solenoid 126 to cause the gear train to engage and the timer motor to start. If operation of the process is promptly resumed, so that web switch and the load sensitive switch reopen before the timing interval is completed, the timer is automatically recycled to zero upon the release of relay 160. Thus, if the machine is of the type that is normally shut down whenever a reel of material is exhausted, so as to permit shifting a full reel into place and threading the web through the rolls, then the timer might be set to allow slightly more than the normal time for this procedure to be carried out, without tripping the switch 128. Upon completion of the rethreading and opening of the web switch 142 within such allowed interval, the timer will recycle to zero without interfering with the machine operation, since the solenoid-actuated motor switch 112 remains closed throughout this operation.

In the event that an abnormal delay occurs in restoring the machine or process to running condition, the snap switch 128 will be tripped by the timer at the end of the allotted time. This breaks the circuit to the timer motor 120 to stop the same, but leaves the gear train engaged to prevent the timer dial from returning to zero. When the switch 128 goes to its left hand position, the time delay recorder motor is started, and the disabling relay 162 is energized. This serves to break the holding circuit for the motor switch 112, thereby stopping the main driving motor 100. The extra contact on the timer switch 128 provides a holding circuit for the relay 160 to prevent deenergization until the machine is restarted by the special restart circuit. The machine has thus, by reason of the undue delay, temporarily been disabled through the operation of the analyzer. To restore the machine to operation, one of the special restart switches 136 must be actuated. This involves selection of the appropriate switch to designate the cause of the delay, and actuation of the switch serves to record both the cause and the duration thereof.

The actuation of a restart switch sets the driving motor in operation by means of relay 164. When the upper contacts of this relay open, the timer is recycled to zero, allowing the snap switch 128 to assume its normal, right-hand position and thereby (a) stop the recorder motor, (b) deenergize the disabling relay 162, and (c) break the holding circuit of relay 160. The lower contacts of relay 164 then closes to energize the solenoid of the main switch 112, which is thereafter held closed by its holding circuit.

While it may take a brief period following the actuation of the restart switch, before the web is drawn into position and the running load is on the motor, there will normally be ample time for this to occur without interference by the analyzer, since the timer has just been recycled to zero by the actuation of the restart switch. As long as normal conditions are restored before the allotted time again runs out, the timer will recycle to zero and remain inactive upon the opening of the web and load switches and the release of relay 160.

For certain types of production analysis, it may be desirable to have a record not only of the duration and causes of interruptions to normal operation, but also to have a permanent record of the normal operating times and machine output. Such type of record is provided by the analysis apparatus shown in Fig. 3. This embodiment, like that of Fig. 1, is adapted for use on machines that perform a repetitive operation, and the rudimentary machine is merely illustrative of such type. The work 180 is inserted in the machine between centers 182 and while being inserted trips a piece switch 184 by the actuation of plunger 186. A driving motor 188 supplied with current through the solenoid-actuated switch 190 is controlled by start and stop switches 192 and 194 whenever the work is to be changed during normal operation.

The timer unit of the analyzer may be the same as that of the first described embodiment, comprising a synchronous motor 198, gear train 200, solenoid 202 in control of the gear train engagement, and a timing dial 204 having a fixed arm 206 and a settable arm 208 for actuating the snap switch 210. The recorder unit likewise resembles the first described recorder, comprising a driving motor 214 and drum 216 for advancing the paper strip 218 past the several restart and marking switches 220. These switches are appropriately designated as to the various categories of delays and interruptions. The recorder includes, in addition, a solenoid-actuated marker 222 that is held out of engagement with the paper record strip when the solenoid is energized. When the solenoid is deenergized, as occurs briefly with each actuation of the piece switch, the pointed member 224 marks or perforates the paper under the influence of spring 226, the marker being withdrawn as soon as the solenoid is reenergized.

In this embodiment of the invention, the recorder runs continuously throughout the work shift, being started when the main switch (not shown) is thrown in by the foreman at the beginning of a shift. With the start of the recorder, the marker solenoid 222 is energized to withdraw the marker. When the first piece of work is inserted in the machine and the piece switch 184 makes momentary contact, the relay 230 is tripped to break the upper set of contacts and thereby recycle the timer. At the same time, the marker solenoid 22 is briefly deenergized to place a mark on the advancing paper record. As soon as the relay 230 releases, the marker is retracted. This operation is repeated as each piece of work is inserted in the machine, provided the successive operations are completed within the time interval for which the timer is set. The position of the marks along the paper record indicates the times required for the individual operations, as well as giving an accurate piece count.

In the event an operation is not completed within the interval for which the timer has been set, so that the switch 210 is tripped, then relay 232 is energized to disconnect the piece switch from the recycling relay 230 and to connect the switch to the disabling relay 234. When the delayed operation has finally been completed and an attempt made to start work on a new piece, actuation of the piece switch then energizes the disabling relay to throw out the motor switch 190 and temporarily disable the machine, the normal start switch 192 being inoperative under these conditions.

As in the previously described embodiments, the machine can only be restarted by the special restart switches, in order to insure that the duration and cause for the delay will be recorded on the paper record strip. Actuation of a restart switch recloses the motor switch 190, recycles the timer, and provides a mark on the paper record to permit identification of the duration and cause of the delay.

In each of the illustrative embodiments, the recorder unit will be under the supervision of the management, who will have charge of removing the records for subsequent study and analysis. While the type of recording that has been shown and described for purposes of illustration permits ready identification and tabulation of the various delays and the times involved, it is obvious that other types of recording, including remotely-actuated as well as direct-actuated types, may be substituted without departing from the invention.

Having indicated the nature of the invention by the several embodiments shown and described, I claim:

1. Apparatus for production analysis of a machine comprising a timer for timing an interval within which the machine operation is normally completed, means for resetting the timer to initiate a new timing interval upon completion of the operation within said interval, time recording means rendered operative by expiration of the timing interval without completion of the operation to record time in excess of said timing interval, disabling means likewise rendered operative by expiration of the timing interval without completion of the machine operation for disabling the machine from thereafter normally initiating a new machine operation, and means comprising a restart device for initiating a new machine operation following operation of the disabling means, said restart device having manually controlled means associated therewith and actuated thereby for causing data as to the reason for incompletion of the operation within the timing interval to be transcribed on the time record.

2. Production analysis apparatus for indicating the nature and duration of interruptions in normal operation of a machine, said apparatus having means for advancing a record-receiving medium timing means for timing an interval of predetermined duration within which an operating cycle is normally carried out, a recycling circuit for causing the timing means to repeat the timing interval, a cycling switch actuated with each operating cycle to initiate each timing period of the timing means during normal operation, a disabling circuit for stopping the machine upon actuation of said circuit, switching means under the control of the timing means and operative upon expiration of the timing interval for disconnecting the cycling switch from the recycling circuit of the timer and for connecting said switch to the disabling circuit to temporarily disable the machine upon subsequent actuation of the cycling switch and thereby prevent normal initiation of a new operating cycle, a restart circuit for restoring the machine to operation following operation of the disabling circuit, selector mechanism under the control of the machine operator for placing on the record-receiving medium marks identifying the causes for non-completion of operations within the predetermined time interval, and connections between the selector mechanism and the restart means for rendering the restart means operative, following actuation of the disabling circuit, only upon actuation of the selector mechanism by the operator to place a cause-identifying mark on the record-receiving medium.

3. Apparatus for production analysis of a machine said apparatus comprising means for advancing a record-receiving medium, selector mechanism under the control of the machine operator and actuable to place on the record-receiving medium marks identifying the causes of interruptions in machine operation, a restart circuit in control of machine restarting following an interruption in machine operation, and connections between the selector mechanism and the restart circuit to cause said circuit to restart the machine following an interruption, only upon actuation of the selector mechanism by the operator to place a cause-identifying mark on the record-receiving medium.

4. Apparatus for production analysis of a machine to indicate the nature and duration of interruptions in normal machine operation, comprising means for advancing a record-receiving medium at a timed rate of advance, selector mechanism under the control of the machine operator and actuable to place on the record-receiving medium marks identifying the causes for and the expiration of interruptions in machine operation, a restart circuit in control of machine restarting following an interruption in machine operation, and connections between the selector mechanism and the restart circuit to cause said circuit to restart the machine following an interruption only upon actuation of the selector mechanism by the operator to place a cause-identifying mark upon the record-receiving medium.

5. Apparatus for production analysis of a machine comprising detecting mechanism adapted to be connected to the machine and responsive to departures from the normal operation of the machine, disabling means under the control of the detecting mechanism and rendered operative upon the detection of a departure from normal operation of the machine to prevent a continuation of operation of the machine, selector mechanism under the control of the machine operator for placing on a record-receiving medium marks identifying the causes for departures from normal in the operation of the machine, restart mechanism for restoring the machine to operation after actuation of the disabling means, and connections between the restart means and the selector mechanism to render the restart means operative, following actuation of the disabling means, only upon actuation of the selector mechanism by the operator to place a cause-identifying mark on the record-receiving medium.

6. Apparatus for production analysis of a machine to indicate the nature and duration of interruptions in normal machine operation, comprising means for advancing at a timed rate of advance a record-receiving medium, means responsive to normal cyclic operation of the machine to place a cycle-identifying mark on the record-receiving medium for each repetition of the machine cycle, timing means responsive to deviations from a predetermined allowed cycle time, a disabling circuit associated with the timing means and rendered operative to disable the machine against continued operation upon detection of a departure from the predetermined cycle time, a restart circuit in control of machine restarting following operation of the disabling circuit, selector mechanism under the control of the machine operator to place on the record-receiving medium a mark identifying the cause and expiration of the interruption in normal operation, and connections between the selector mechanism and the restart circuit to cause said circuit to restart the machine only upon actuation of the selector mechanism by the operator to place a cause-identifying and timing mark upon the record-receiving medium.

7. Apparatus for production analysis of a machine to indicate the nature and duration of interruptions in normal machine operation, comprising means for advancing at a timed rate of advance a record-receiving medium, a timer, means for initiating a timing interval at the commencement of an operation cycle of the machine, the timing interval being sufficient to permit the operation cycle normally to be completed before expiration of the interval, a disabling circuit operative upon expiration of the timing interval without completion of the machine cycle for causing the machine to stop upon attempted initiation of a new operation cycle, selector mechanism under the control of the machine operator for placing on the record-receiving medium marks identifying the causes for non-completion of operations within the predetermined time interval, a restart circuit for restoring the machine to operation following actuation of the disabling means, and connections between the selector mechanism and the restart circuit to restart the machine upon actuation of the selector mechanism by the operator to place a cause-identifying mark on the record-receiving medium.

8. Production analysis apparatus for indicating the nature of interruptions in machine operation, comprising means for advancing a record-receiving web at a timed rate of advance, a plurality of marking devices disposed transversely of the web, said devices being selectively actuable by the operator to place on the web marks identifying the causes of machine interruption, a restart circuit in control of machine restarting following an interruption, and connections between the marking devices and the restart circuit for starting the machine upon actuation of a marking device to place a cause-identifying mark on the web.

9. Production analysis apparatus for indicating the nature and duration of interruptions in machine operation, comprising means for advancing a record-receiving web at a timed rate of advance, a plurality of marking devices disposed transversely of the web for placing on the web marks identifying the causes of interruption to operation of the machine, a plurality of push-button means connected to said devices and under the control of the operator for selective actuation to place on the web, following an interruption, a mark identifying the cause therefor, a disabling circuit for disabling the machine from continued operation upon the occurrence of a departure from operation, a restart circuit for restoring the machine to operation following an interruption, and connections between the push button means and the restart circuit for restarting the machine upon actuation by the operator of said push button means to place on the web a mark identifying the cause of the preceding interruption.

10. Production analysis apparatus for indicating the nature and duration of interruptions in operation of a machine, comprising means for advancing a record-receiving web at a continuous timed rate of advance, selector means under the control of the operator for placing on the web marks identifying the causes of machine interruption, said means causing the marks to be disposed transversely of the web according to predetermined correlation with specific causes to be identified, means for automatically placing on the web during normal operation of the machine marks indicative of said normal operation, a restart circuit for restoring the machine to operation following an interruption, and connections between the selector means and the restart circuit to cause the machine to be restored to operation upon actuation of the selector mechanism by the operator to place a mark on the web in cause-identifying transverse position.

11. Production analysis apparatus for indicating the nature of interruptions in machine operation, comprising means for advancing a record-receiving web at a timed rate of advance, a plurality of marking devices, said devices being selectively actuable by the operator to place on the web marks identifying the causes of machine interruption, a restart circuit in control of machine restarting following an interruption, and connections between the marking devices and the restart circuit for starting the machine upon actuation of a marking device to place a cause-identifying mark on the web.

12. Production analysis apparatus for indicating the nature and duration of interruptions in machine operation, comprising means for advancing a record-receiving web at a timed rate of advance, a plurality of marking devices for placing on the web marks identifying the causes of interruption to operation of the machine, a plurality of push-button means connected to said devices and under the control of the operator for selective actuation to place on the web, following an interruption, a mark identifying the cause therefor, a disabling circuit for disabling the machine from continued operation upon the occurrence of a departure from operation, a restart circuit for restoring the machine to operation following an interruption, and connections between the push button means and the restart circuit for restarting the machine upon actuation by the operator of said push button means to place on the web a mark identifying the cause of the preceding interruption.

EDWIN A. BOYAN.

REFERENCES CITED

The following references are of record in the file of this patent:

UNITED STATES PATENTS

| Number | Name | Date |
| --- | --- | --- |
| 1,242,483 | Shuster et al. | Oct. 9, 1917 |
| 1,309,235 | Avram | July 8, 1919 |
| 1,422,207 | Johnson | July 11, 1922 |
| 2,302,002 | Bryce | Nov. 17, 1942 |
| 2,307,487 | Chilberg et al. | Jan. 5, 1943 |
| 2,344,497 | Cooney | Mar. 21, 1944 |